United States Patent [19]
Watkins

[11] Patent Number: 5,896,189
[45] Date of Patent: Apr. 20, 1999

[54] DEVICE AND METHOD FOR SELECTIVE PHOTOGRAPHIC FLASHING DURING PHOTOGRAPHIC ENLARGING

[76] Inventor: Sprague H. Watkins, 9025 Butte Ave., Vancouver, Wash. 98664

[21] Appl. No.: 08/576,583

[22] Filed: Dec. 18, 1995

[51] Int. Cl.$^6$ .................................................. G03B 27/72
[52] U.S. Cl. .............................. 355/71; 355/77; 355/67
[58] Field of Search ............................ 355/67, 70, 71, 355/55, 77; 362/17, 18, 293

[56] References Cited

U.S. PATENT DOCUMENTS

| | | | |
|---|---|---|---|
| 3,782,821 | 1/1974 | Bosman | 355/70 X |
| 4,296,197 | 10/1981 | Stevie | 355/70 X |
| 4,396,278 | 8/1983 | Brockwell et al. | 355/70 X |
| 5,087,938 | 2/1992 | Nagumo et al. | 355/70 X |

OTHER PUBLICATIONS

*The Complete Art of Pringtin and Enlarging*; Author: Dr. O.R. Croy (pp. 69–62).
*Bigger and Better Enlarging*, Author: Don Nibbelink, F.R.P.S., F.P.S.A ad Rex Anderson, (pp. 143–148).
*Lootens on Photographic Enlarging and Print Quality*, Author: J. Ghrislain Lootens, F.P.S.A., F.R.P.S., (pp. 73–84).
*Beyond Basic Photography*, Author: Henry Horenstein, (pp. 128–131).
*The Print*Author: Ansel Adams, (pp. 123).
*Darkroom & Creative Camera Techniques* (May/Jun. 1995), Author: Bruce Barnbaum, (pp. 48–49).
*The Art of Photography*, Author: Bruce Barnbaum, pp. 94–95).
*Darkroom & Creative Camera Techniques* (Jan./Feb. 1995), Author: John Sexton, (pp. 18–23).
*Color Photography* (Author: Henry Horenstein, (pp. 18–186).

Primary Examiner—R. L. Moses
Attorney, Agent, or Firm—Marger Johnson McCollom & Stolowitz P.C.

[57] ABSTRACT

The invention is directed to photographic flashing during photographic enlarging, when areas requiring darkening can be seen and selectively flashed and provides a photographic enlarger, a photographic negative, a photographic printable substrate, and the auxiliary light source of the present invention. Photographic enlarging of the photographic negative is conducted by emitting light from the photographic enlarger and printing an enlarged photographic image from the photographic negative onto the photographic printable substrate. The auxiliary light source includes controls, which are preferably independently adjustable, for varying (a) light intensity, (b) the area of projected light, (c) contrast, when used with variable contrast enlarging paper, and (d) color hue and density, when used in color enlarging from color negatives. The requisite size, intensity, and contrast or color hue and density of auxiliary light for photographic flashing is added during the photographic enlarging of the photographic negative. This is done by adjusting (a) light intensity, (b) the area of projected light, (c) contrast, when used with variable contrast enlarging paper, and (d) color hue and density, when used in color enlarging from color negatives, of the light being emitted from the auxiliary light source.

25 Claims, 3 Drawing Sheets

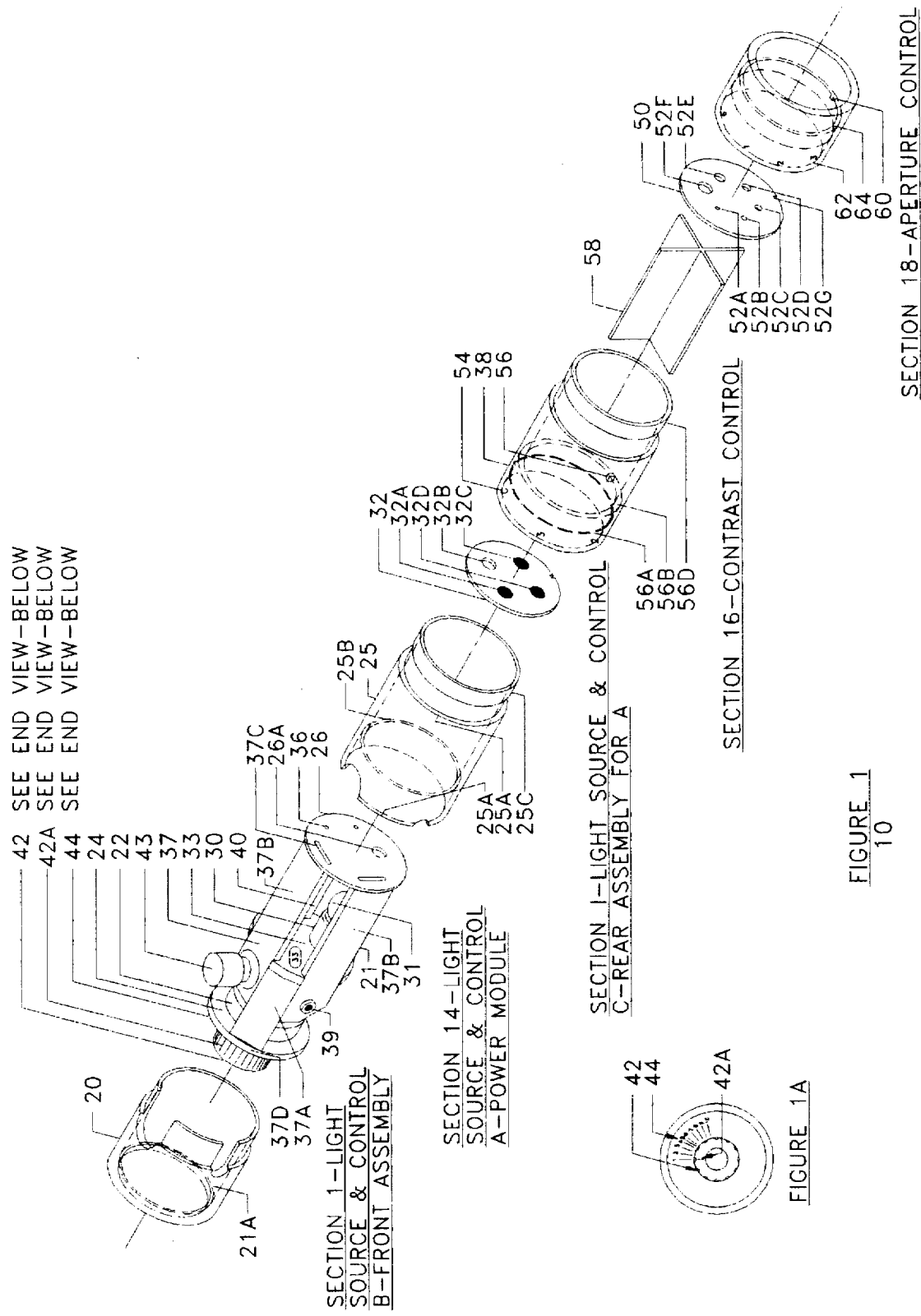

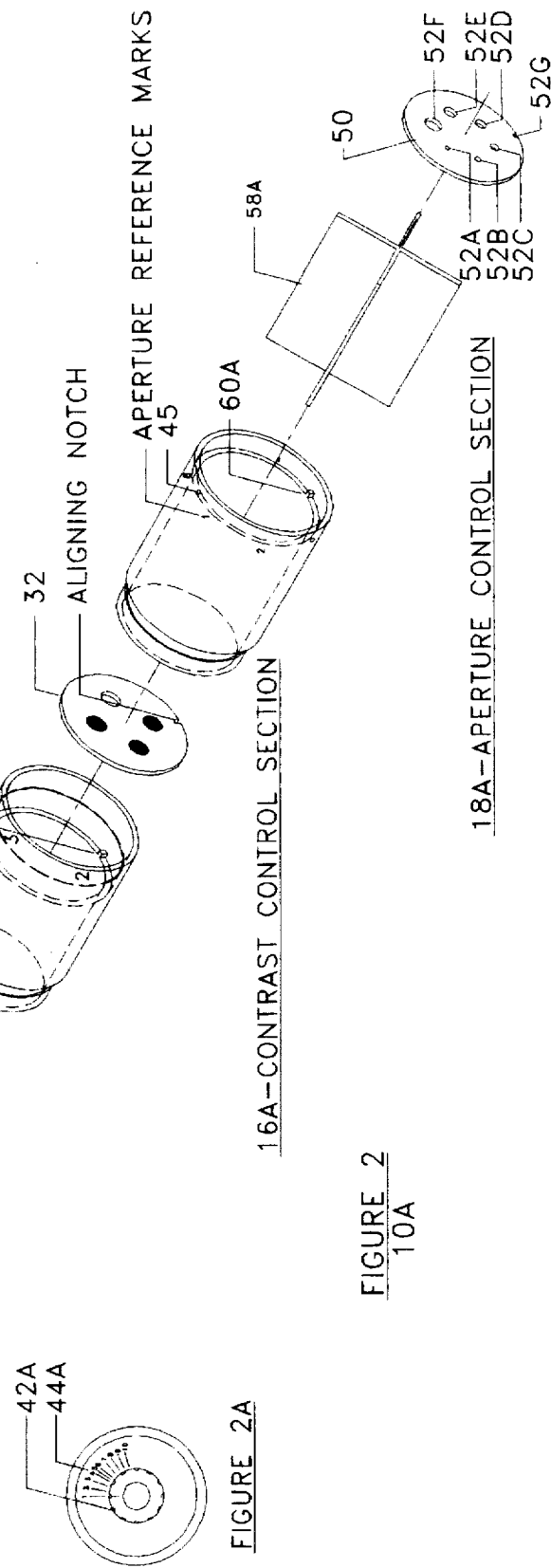

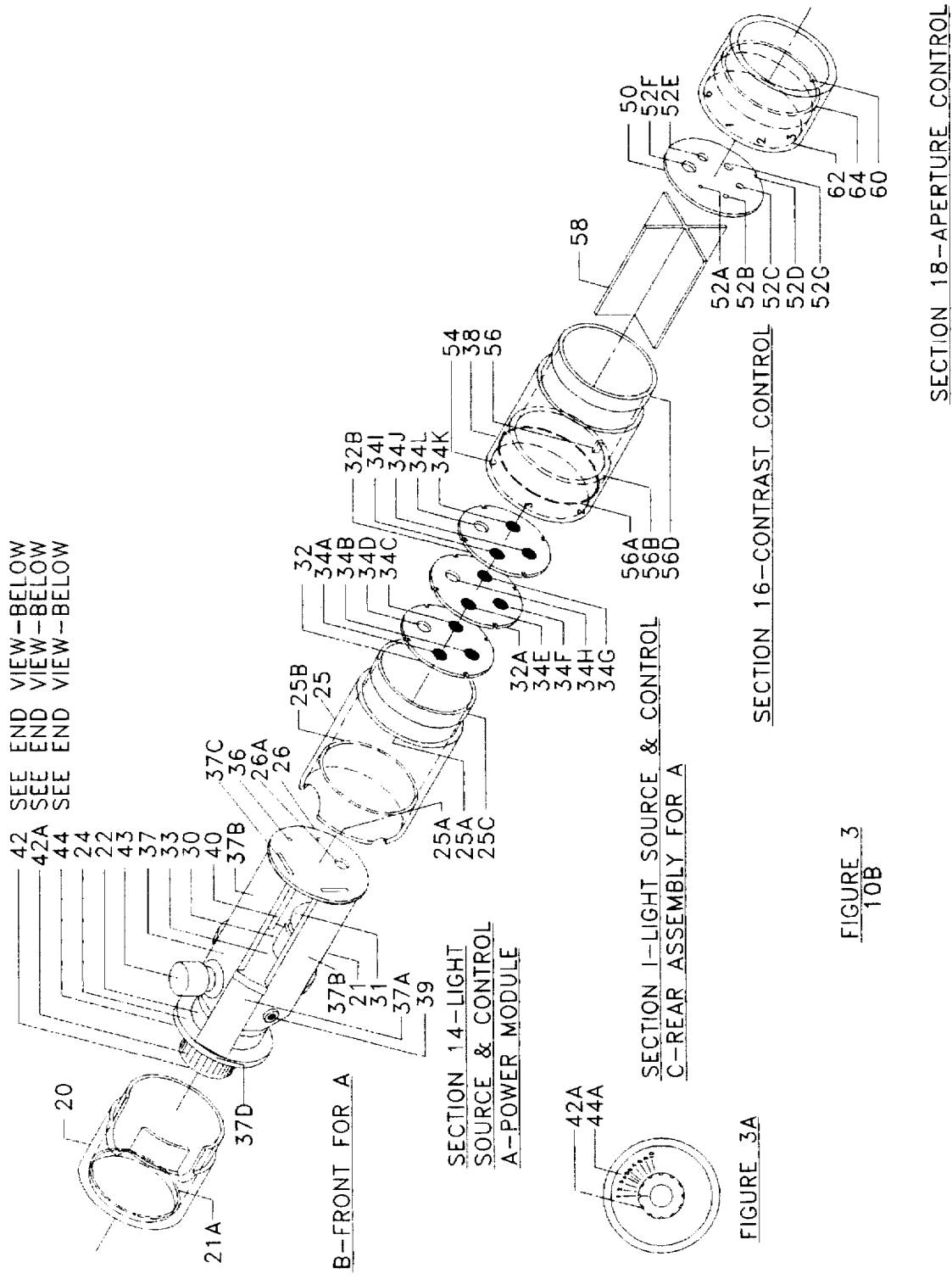

DEVICE AND METHOD FOR SELECTIVE PHOTOGRAPHIC FLASHING DURING PHOTOGRAPHIC ENLARGING

BACKGROUND OF THE INVENTION

The present invention relates generally to a method and to an apparatus for photographic flashing, and more particularly to a method and apparatus for conducting photographic flashing using an auxiliary light source.

"Photographic flashing" is a process which adds blank (no image) light to enlarging paper. Sources of blank light which have been used in the past include the enlarger itself, low wattage light bulbs and small flashlights.

Croy (1) used an enlarger, with no negative in place, to eliminate unwanted detail. Masks were used to protect areas which did not require flashing. A pocket flashlight was used to darken print corners. The beam of light was concentrated with a tapered cardboard sleeve. This prior art device also was used to paint over specific areas for creating shadows and abstract designs. Although Croy warned about problems with light that was too bright, he offered no methods for reducing intensity.

Nibbelink and Anderson (2) used methods similar to those described by Croy for area flashing, i.e., an enlarger with negative removed, and used a penlight for flashing detail. Nibbelink and Anderson suggested the use of translucent tape to reduce light intensity. A further suggestion was to use a 7 ½ watt appliance bulb operating on A/C current to ensure constant brightness.

Lootens' (3) preferred method for flashing used a 7 ½ watt bulb suspended about four feet above a flashing table. Its intensity was reduced by partially covering it with adhesive tape. The following methods were suggested for locating areas to be flashed: (1) Reference to a finished print placed next the paper being flashed. (2) Markers placed on the flashing frame to indicate horizontal and vertical axes of areas. (3) Projection of the image through a red filter to locate the area to be flashed, then flash with a small flashlight held close to the paper. Lootens described this method as intriguing but extremely hard to control. He considered an enlarger, with negative removed, to be the best light source for flashing but felt the inconvenience outweighed its advantages. Lootens believed flashing to be one of the most effective tone control methods available in photography. However, he apparently did not appreciate its value in bringing out detail in highlight areas.

The method of Lootens was also used by Horenstein (4). The beam from a small flashlight was focused with a black paper cone and reduced in intensity by layers of tissue.

Ansel Adams (5) used an enlarger for photographic flashing. However, Adams left the negative in the carrier and placed a diffusion disk below the lens to obtain blank (no detail) light. Adams recognized the value of flashing in bringing out detail in highlight areas such as clouds, white water and white painted objects. He also felt that flashing had limitations and for fine prints considered it as a method of last resort.

In recent articles, two of today's outstanding photographers and printers discuss flashing techniques. Bruce Barnbaum (6) mentions the value of flashing to bring out detail in highlight areas then gives an example in which overly bright areas are subdued by flashing to obtain improved tonal balance. Barnbaum uses an enlarger, with negatives removed, as the light source. Also, in a recent photography manual, Barnbaum (7) discusses flashing in more detail. To flash specific areas, Barnbaum places markers on the easel to show vertical and horizontal coordinates of areas then flashes through a hole cut in a large mat board. John Sexton (8) also uses an enlarger as a light source for flashing and employs filters to control contrast.

A review of representative literature and discussions with other photographers in the field today indicates that the enlarger is the preferred light source for flashing. Here are the steps involved a process using an enlarger:

(1) A straight print is made to identify areas which require flashing.

(2) The negative is removed from the enlarger and a series of test strips are made to determine the aperture and exposure time required to obtain the desired amount of blank light.

(3) The negative is returned to the enlarger and the image positioned as desired.

(4) If areas to be flashed are inside the borders, their images are traced onto mat board and cut out to form flashing masks.

(5) The projected image is again examined and markers are placed on the horizontal and vertical axes of the easel to mark the centers of the areas to be flashed.

(6) Enlarging paper is placed in the easel and exposed for the time and at the aperture determined for step 1, above.

(7) The negative is removed from the enlarger and the lens is stopped down to the required aperture.

(8) The center of the cutout in a flashing mask is placed over the intersection of the horizontal and vertical markers placed on the easel (as seen in the mind's eye).

(9) Blank light is added for the exposure time determined in step 2 above.

(10) The exposed and flashed enlarging paper is processed and the resulting print is examined. If any change in exposure time or flashing time or any other changes are desired, steps (1)–(10) are repeated.

If tone changes desired involve only delicate highlight areas it may be possible to flash the entire sheet of enlarging paper. This would simplify the procedure by eliminating steps 4,5 and 8. However, this may cause a slight loss of overall contrast and a slight dulling of some highlights.

Flashing also has been used in making color prints from color negatives. Just as for black and white prints, flashing can be used to reduce contrast, add tone to a very bright area or to improve tonal balance. Horenstein (9) described a flashing method for doing this and also for compensating for the orange base of color negative film. His procedure is similar to the one described above. An enlarger, with appropriate filters in place, is used as the light source. Horenstein emphasized that flashing times were critical and used a digital timer to control exposures of one second or less. A total of 13 steps are involved in the flashing procedure described by Horenstein.

REFERENCES

1) Croy, Dr. O. R. (1978). The Complete Art of Printing and Enlarging. pp. 61–62. The Focal Press, New York, N.Y.

2) Nibbelink, Don and Anderson, Rex. (1974). Bigger and Better Enlarging. pp. 143–148. American Photographic Book Publishing, Co. Inc. (Amphoto) Garden City, N.Y.

3) Lootens, J. Ghislain (1967). Lootens On Photographic Enlarging and Print quality. 7th Rev. Ed., pp. 73–89. Amphoto, N.Y.

4) Horenstein, Henry (1977). Beyond Basic Photography. pp. 128-130, Little Brown and Company, Boston, Mass.

5) Adams, Ansel (1983). The Print: The New Ansel Adams Photography Series, Book 3, p. 123, Little Brown and Company, Boston, Mass.

6) Barnbaum, Bruce (1995). Master Printing Class Darkroom and Creative Camera Techniques, Vol. 16, No. 3 (May/June pp. 48-49)

7) Barnbaum, Bruce (1994). The Art of Photography, An Approach to Personal Expression, p. 101. Kendall Hunt Publishing Co. Dubuque, Ind.

8) Sexton, John (1995). Listening to the Print, Darkroom & Creative Camera Techniques. Vol. 6, No. 1. (Jan/Feb) pp 18-23.

9) Horenstein, Henry (1995). Color Photography. A Working Manual, Little Brown and Company, Boston, Mass.

SUMMARY OF THE INVENTION

The invention is directed to a method and apparatus for photographic flashing during photographic enlarging. This method and apparatus can be used in black and white enlarging, and for color enlarging from color negatives. Both the black and white and color versions are used to add a predetermined amount of blank light to enlarging paper to bring out detail or add tone to delicate highlight areas, to remove distracting elements from dark background or to create more pleasing tonal balances. The color version also is used to create a more pleasing color balance or to produce color effects. Both can be used during the main photographic exposure when areas which require flashing can be seen and painted with light.

The invention is directed to photographic flashing during photographic enlarging, and comprises providing a photographic enlarger, a photographic negative, a photographic printable substrate, and the auxiliary light source of the present invention. Photographic enlarging of the photographic negative is conducted by emitting light from the photographic enlarger and printing an enlarged photographic image from the photographic negative onto the photographic printable substrate. The auxiliary light source includes controls, which are preferably independently adjustable, for varying (a) light intensity, (b) the area of projected light, (c) contrast, when used with variable contrast enlarging paper, and (d) hue and density, when used in color enlarging from color negatives. The requisite size, intensity, and contrast of auxiliary light for photographic flashing is added during the photographic enlarging of the photographic negative. This is done by adjusting (a) light intensity, (b) the area of projected light, (c) contrast, when used with variable contrast enlarging paper, and (d) color hue and density, when used in color enlarging from color negatives, of the light being emitted from the auxiliary light source. In this way, the detail is brought out in the delicate highlight areas, and/or distracting elements are removed from dark backgrounds and/or tonal balances are improved and/or special effects are created in an enlarged photographic print. Photographic flashing with the auxiliary light source is typically carried out without requiring additional exposure time.

Preferably, the flashing time is equal to the main exposure with the enlarger and done at the same time.

In another aspect of the present invention, the auxiliary light source can be employed to photographically flash more than one area of the print paper during a divided main exposure sequence. By using this technique, at least one area of the photographic printable substrate can be photographically flashed at a first combination of settings (intensity, contrast and area) and another area of the photographic print-able substrate can be photographically flashed at a second combination of settings. One can photo-graphically flash delicate highlights with appropriate lower contrast filters, and photographically flash dark shadow areas with appropriate higher contrast filters.

The auxiliary light source preferably comprises a first section which emits light. It also can include a second section which has a plurality of filters for controlling contrast in the black and white version, or for controlling color hue and density in the color version. By rotating the first and second sections with respect to each other the contrast of the light being emitted by the auxiliary light source is adjusted in the black and white version. Alternatively, the preferred auxiliary light source can include a second section which controls color hue and density, when used with color enlarging paper and a third section which includes a plurality of apertures for controlling the area of projected light. In the latter case, the third section is arranged with respect to first and second sections so that it adjusts the area of the light being emitted by the auxiliary light source at a desired contrast or color hue and density. In any case, the adjustable controls for varying light intensity preferably include a calibrated dial for adjusting the relative light intensity.

The auxiliary light source generally includes replaceable discs. In one instance, the replaceable discs have at least one aperture for controlling the area of projected light from the auxiliary light source. The size and shape of the apertures in each of these replaceable discs is determined by the size and shape of the area of the light to be emitted from the auxiliary light source. In a second instance, the auxiliary light source includes replaceable discs for controlling the contrast range of the auxiliary light source. Finally, the replaceable discs can be employed for controlling the range of the hue and density of the primary cyan, magenta and yellow colors.

One of the most preferred photographic flashing techniques is know as feathering. In this procedure, blank light from the auxiliary device is projected onto the image projected from the enlarger. Then, the blank light is moved back and forth across the area to be flashed and slightly into adjacent areas. In this way, a smooth photographic appearance is produced.

Another method for photographic flashing is employed herein when all of the flashing cannot be done during the main exposure. One instance of this type of flashing is when there are many areas which require flashing. Flashing is done during the main exposure so that as many areas are flashed as practicable. The flashed print is then placed into the developer and is developed for about ½ the normal time required for fully developing the print, or until the highlights (the light areas in the print) are clearly visible under a safelight. The partially developed print is then placed on a smooth surface, is rinsed with cold water to remove the developer, and is then wiped to remove excess moisture. The areas requiring flashing are then selectively flashed for the required times using the subject auxiliary light source under the required flashing conditions. The flashed print is then returned to the developer to complete the print development process.

This invention and its ease of use combine to transform inexact photographic flashing from an inexact and time consuming procedure into one which is precise and can be used routinely without adding significant time to enlarging processes.

BRIEF DESCRIPTION OF THE DRAWINGS

FIG. 1 is an exploded, perspective view of a first preferred apparatus of the present invention for providing an auxiliary light source for photographic flashing.

FIG. 1A is an end view of the rheostat assembly of FIG. 1.

FIG. 2 is an exploded, perspective view of a second preferred apparatus of the present invention for providing an auxiliary light source for photographic flashing.

FIG. 2A is an end view of the rheostat assembly of FIG. 2.

FIG. 3 is the exploded, perspective view of FIG. 1 including filter discs for a color version.

FIG. 3A is an end view of the rheostat assembly of FIG. 3.

DETAILED DESCRIPTION OF THE PREFERRED EMBODIMENT

Unlike the prior art photographic flashing procedures, flashing with the apparatus, denoted "10" in FIG. 1, of the present invention is done during the main exposure. It is convenient and precise to flash during the entire main exposure. Flashing time is held constant and light intensity is adjusted to obtain the desired effect. If more than one area is to be flashed, the main exposure can be split to time each flashing step. This also makes it possible to flash one area with one contrast and another area with a different contrast. This is an important capability with variable contrast papers especially when split contrast printing procedures are being used. In general, flashing of delicate highlights can be conducted using low contrast filters, for example (Ilford #00-1). Dark shadow areas can benefit from higher contrast filters, for example (Ilford #3-5). Contrast is selected by rotating section 16 (see FIG. 1) until the desired filter lines up with reference marks.

Flashing with apparatus 10 is like painting with light. A circle of blank light is projected, then the scope of the light is adjusted to fit well within the area to be flashed. During the main exposure, the circle of light is moved back and forth across the area to be flashed in a "feathering" action.

There is a basic difference in information gained from "test strips" using the subject invention, compared with that obtained from prior art methods. With the device of this invention, flashing is selective and simultaneous with main exposures. "Test strips" show the actual effect that flashing will have on the final image. Also, a large number of flashing variables such as contrast, light intensity and "painting technique" can be rapidly tested and resulting test strips processed simultaneously.

In comparison, when an enlarger is used as a source of light for flashing, test strips are made to determine exposure required to reach a threshold on blank enlarging paper. Further testing is required to evaluate various combinations of main exposure and flashing exposure on the actual image. Since it is necessary to remove the negative and change aperture for each change in flashing, the procedure becomes very tedious.

Referring now to FIG. 1, a photographic flashing device 10 is provided which has three cylindrically-shaped integral sections 14, 16 and 18. Device 10 comprises three sections, i.e., an illumination section 14, a contrast control section 16 and an aperture control section 18. The design of device 10 offers secure alignment of the light source and light guide, easy access to the power-light module for bulb replacement and other servicing, relatively easy assembly of electronic components and free space around the lamp for cool operation and long life.

In the design of device 10a (see FIG.2), the respective sections 14a, 16a and 18a are retained, but the light guide 26 and the remaining supporting structure is eliminated. In place of the supporting structure and light guide disc, a tube 46 is fitted over the lamp base 30a. The length of the tube 46 extends to the edge of the rear end of section 16a. When sections 14a and 16a are snapped together, the light guide 46 comes very close to contrast filter disc 32.

Referring again to FIG. 1, device 10 comprises three main sections 14, 16 and 18, which snap together to form an integral cylindrical shape. Each section has internal components with specific functions. Section 14 provides illumination. It also has system reference mark 25a for aligning the centers of contrast filters 34a–34d (see section 16) and apertures 52a–52f (see section 18) with the center of the light guide aperture source 26a.

More specifically, light source and control module 21 of cylindrical section 14 contains all of the electrical and mechanical components to deliver light at the desired intensity. The front end (not shown) of module 21 fits within the confines of a cylindrically shaped outer assembly 28 which adjoins rear assembly 38 thereby surrounding and protecting the aforementioned electrical and mechanical components.

The electrical and mechanical components include a rheostat 22 which is used to control light intensity. The rheostat is center-mounted on a rheostat mounting disc 24. A typical rheostat for use herein is rated at 1.2 watts with a 20 ohm resistance. The rheostat mounting disc 24 also has a slot (not shown) to match the tab (not shown) on a mounting piece 37a and two partially drilled holes (not shown) for receiving spacing rods 40. The rheostat assembly includes a rheostat knob 42 and a calibrated dial 44. The calibrated dial 44, which is calibrated in relative light intensity units, fits over a rheostat shaft (not shown) and onto its mounting disc 24. The rheostat knob reference mark 42a can be lined up with any desired mark on the calibrated dial 44 then secured in position with, for example, a set screw (not shown).

A lamp base 30 and lamp 31 are also provided as a light source for device 10. The lamp base 30 can be a threaded E-10 base which is fitted with a lamp 31 comprising a screw-base lamp rated at 2.33 V. and 270 ma. The lamp base mounting disc 33 has a mounting hole located off center, in from the disc edge, one cut out for receiving the mounting piece 37 and two holes for receiving spacing rods 40.

A light guide disc 26 is also provided which includes an off-center hole 26a which is in alignment with the center of the lamp base 30, the centers of filters 32a–32d in section 16, and the centers of apertures 52a–52f in section 18 when rotated into position. The light guide disc 26 also has two slots which receive tabs on the mounting piece 37, and two holes 36 for receiving spacing and support rods 40. A power input jack 39 is secured onto the mounting piece 37. Jack 39 matches a plug which is connected to an AC/DC step-down adapter supplying 3 Volts DC (Not shown). An On/ Off switch 43, of the SPST, push on-push off type is secured onto the mounting piece 37.

Mounting piece 37 is a modified Y type design with an extended "leg" 37a and two arms 37b. The leg 37a and arms 37b include tabs 37c and 37d, respectively. The front tab 37d fits into the slot (not shown) in the rheostat mounting disc 24 and the rear tabs 37c fit into the slot in the light guide disc 26. The two arms extend down the leg and are integral parts of it. The arms pass through a matching cut-out (not shown) in the lamp base mounting disc 33. They are secured by their tabs (not shown) which fit into slots in the light guide 26. One arm is drilled for the power input jack 39. The other arm which is 90° counter-clockwise when viewed from the front, is drilled for the On/Off switch 43.

The spacing rods 40 are typically plastic rods having their ends reduced to fit holes in the discs 24, 26 and 33. Rods 40 connect the rheostat mounting disc 24 and lamp base mounting disc 33 and the light guide disc 26. Rods which connect the lamp base mounting disc 33 and the light guide 26 provide a predetermined focal length, the distance between the light guide 26 and aperture disc 50. In addition to their spacing function, these rods are an integral part of the power module and provide for structural rigidity. Electrical components of the power module are connected, in series, by soldering.

The front assembly 20 is the front part (closest to user) of section 14 and is one part of a two piece assembly which holds the power module 21. Front assembly 20 has an inner lip 21a which rests on the rheostat mounting disc 24 when assembled. The diameter of a rear portion of the length of the front assembly 20 is less than the rest of the unit. This is to provide for a friction fit with the front, female end of rear assembly 25. The front assembly 20 also has semi-circular cut outs which fit over the power input jack 39 and an On/Off Switch 43 to match similar cut outs in rear assembly 25.

The rear assembly 25 is the rear part (farthest from the user) of section 14. The front of rear assembly 25 has a smaller inside diameter than the rest of the unit. It also has cut outs, complimentary to those of front assembly 20 for the power input jack 39 and On/Off Switch 43. These features allow assemblies 20 and 25 to smoothly slide together and firmly hold power module 21 in place. The rear of section 25 has a smaller outside diameter than the rest of the unit. Also, it has a narrow lip 25c. This provides for a snap-fit connection to the front end of section 16. Rear assembly 25 also has primary reference marks 25a which align with the center of the light guide aperture 26a in the assembled section.

Part of the front end of the contrast control section 16 has a smaller inside diameter than the rest of the section. This in combination with a lip 56a provide for a snap fit with the rear end 25c of section 14. A retaining pin 56 projects through the body of Section 16 and onto the ridge 56b created at the front end of Section 16 by its smaller inside diameter. The pin 56 secures and orients the filter disc 32. Filter disc 32 has four equally spaced holes 34. Three of the holes 34 are fitted with variable contrast filters 34a–34c. The fourth hole 34d is left blank. If desired, the disc 32 can be replaced easily with optional ones with different contrast filters. The centers of the four holes are offset from the edge of the disc. When rotated to align filter reference marks 54 with system reference marks 25a, the filter centers are in line with the light guide aperture 26a of section 14. "Downstream" from the filter disc 32, the baffle 58 extends to the end of the cylinder of section 16 to form four separate compartments. This isolates each filter 34a–34d to provide a single circle of light of the desired contrast, with no interference from adjacent compartments. The baffle 58 and all other inside surfaces have a black matte finish to minimize internal reflections. The rear outside diameter of section 16 is less than the rest of the of Section 16, and it has a lip 56d for a snap fit with the front of section 18. As section 16 rotates around section 14, labels and reference marks 54 show which filter is lined up with the light guide aperture 26a.

Aperture control section 18 has a front inside diameter smaller than the rest of the unit and has a lip 62 for a snap fit with section 16. A pin 60 projects through the body of Section 18 onto the ridge 64 formed by different internal diameters. The aperture disc 50 has a notch 52g which fits over the retaining pin 60 to secure and orient the disc 50. The disc 50 has six apertures 52a–52f whose centers are in alignment with the filter disc 32 of section 16 and the light guide 26 of section 14.

The disc can be easily removed and replaced with optional ones for special applications. Standard aperture diameters for the discs are:¹⁄₁₆" (52a), ³⁄₃₂" (52b), ⅛" (52c), ⁵⁄₃₂" (52d), ³⁄₁₆" (52e), and ¼" (52f). The inside surface of section 18 has a black matte finish to minimize reflections. Section 18 is connected for rotational movement about section 16 or section 14. Section 18 is labeled so that the desired aperture can be aligned with the desired contrast filter in section 16 and the light guide aperture 26a in section 14.

As previously stated, the adjustments which can be made to the subject device 10 include contrast, light intensity and aperture size. As for adjusting the contrast, the contrast control section 16 is rotated so that the desired filter 24 lines up with the desired reference mark 54 on section 16 and system reference marks 25a or section 14.

With respect to light intensity, the device 10 is maintained at a convenient height above a projected image. Then, the rheostat knob 42 is rotated until circle of light emanating from the device 10 is clearly seen.

As for adjusting the apertures 52a–52f, at a convenient working height, center the device's circle of light over the area to be flashed. Place one hand on the contrast section 16 to prevent it from turning. Rotate the aperture section 18 until the projected circle of light falls within the area to be flashed.

Regarding the making of "test strips", after selecting the desired contrast and aperture as previously described, set the light intensity at 1. Position a small piece of enlarging paper over the area to be flashed. Turn on device 10 and start the main exposure. Using the technique described, selectively flash for the entire main exposure time. Put the exposed paper in a light proof box. Repeat this procedure at intensity settings of 3, 5 and 7. Process the four "test strips", dry and examine. If necessary, fine tune by testing intermediate settings and/or different contrasts. Then, make a full-size, flashed print. Repeat the "test strip" process if required. Preliminary testing can be minimized by calibrating the instrument with a darkroom exposure meter, then using the meter to adjust light intensity to produce a desired tone.

Referring now to FIG. 2, the overall design of device 10 has been modified by eliminating the power module from section 14, i.e. device 10a. Illumination section 14a of device 10a is much shorter than that of the original design. Also it differs in that it has two female ends 25d and 25e. The on/off switch 43a and power jack 39a are now mounted directly onto the cylinder in reamed out holes 39b and 43b, respectively. The lamp base 33a and rheostat 24a are mounted on the female ends 25d and 25e and secured with set screws 45. Section 14a has a system reference mark 25a which aligns with the center of the light guide 46.

A tube 46 fitted over the lamp base 30a serves as a light guide 46. It extends well into section 16a because in this design the filter disc 32 is at the far end of contrast control section 16a and it is required that the guide come as close as practical to the filters to form a tightly coupled light path.

Section 16a is about the same length as in the original design. However it has a male (front) end to couple with section 14a and a female (rear) end to couple with aperture control section 18a. The filter disc 32 is at the rear end of 16a. A retaining pin 56 aligns the disc as in the original design. The baffle 58 function is transferred to section 18a. The female end of section 16 couples with the male end of section 18a.

Aperture control section 18a, on the other hand, is much longer than in the original design. Its male end couples to the female end of section 16a close to the filter disc 32. A baffle 58a extends the length of the section to maintain coupling of the light path from the lamp 31a to exit apertures 52a–52f. The aperture disc 50 is aligned with notch 52g and a retaining pin 60a and held in place with a set screw 45.

Although individual sections of device 10a in this option differ from the original design, the overall length is the same. The distance from the lamp 31a to apertures 52a–52f provides a "focal length" which is the same as in device 10.

Devices 10 and 10a include a 3 volt DC lamp for safe, cool operation which operates from an adapter (step-down transformer) which supplies 3 volts DC from line (117 v a/c) voltage. However, it also can operate from two series connected AA or AAA cells. Filter discs 32 are easily removed and can be replaced by optional discs with different contrasts. Aperture discs 50, as with filter discs 32, can be replaced with optional discs with a different range of apertures. Also available are notched cardboard blanks (not shown) for producing openings of different sizes and shapes.

Color negatives seldom produce satisfactory prints with respect to color balance unless the color of light from the enlarger used is modified by filters. This is due in part to variations in the color of light when the picture was taken, variations in processing and materials even to aging of the enlarger light source. To compensate for this, filters are placed in the path of light from the enlarger. If a color print is slightly too yellow a pale yellow filter is placed in the light path. If the yellow is more pronounced, a denser yellow filter is used. Similarly, if a color print has a magenta cast an appropriate magenta filter will be used to correct it and for excessive cyan, cyan filters are used. For negatives, excessive color casts are removed by a filter of its own color. Some color corrections require more than one filter. For example, excessive green casts are corrected by a combination of cyan and yellow, excessive blue by a combination of magenta and cyan, and excessive red by combinations of magenta and yellow filters. Depending on the tint of the excessive color, filters may be used in different strengths. Typically, filters are supplied in different densities ranging from 05 (weak) to 50 (very strong). The combination of filters required to yield a satisfactory color print is called a color pack. In order to flash a color print to enhance detail in highlight areas or to darker tone in other areas it is necessary to duplicate the color pack used in the enlarger. A color version of the auxiliary lighting device would have a disc for each color to cover the required density range. For yellow, disc #Y1 would have a clear opening and three yellow filters with densities of 05Y, 10Y and 20Y. Disc #Y2 would have a clear opening and three yellow filters with densities of 30Y, 40Y and 50Y. Similar discs would be supplied for cyan (C) and magenta (M). Color disc apertures are the same (¼") as those in contrast discs. However, each color disc has four notches, one notch opposite the center of each filter. This makes it possible to put the filters together in any desired combination then slide them over multiple pins to align them with the light source. The construction of the color control section is the same as for the contrast control section of the black and white version expect for the additional retaining and orientation pins. Also, the ridge which the last filter rests upon is further down the cylinder to compensate for the additional thickness of two more discs. This also provides for close coupling to the light guide in the illumination section. In addition to flashing for increasing tone, the filter pack of the auxiliary device can be changed to create unusual, unexpected color effects to increase impact or to create a different mood. With respect to intensity control and aperture selection, the color version of the auxiliary light source works the same way as the black and white model.

Flashing with the color version 10B of the subject apparatus, as depicted in FIG. 3, follows the general principles described for the black and white version. However, instead of different contrast filters in a single rotatable disc, apparatus 10B contains a color control section which comprises three independently rotatable discs. Discs 32, 32A and 32B each have four ¼" diameter openings. One opening in each disc, 34D, 34H, and 34 L, is a 16M-0 and is clear. The other three openings contain different colored filters. For example, disc 32 can contain magenta filters of different densities, such as 16M-5, 16M-10 and 16M-20. If more density is required the filter disc can be easily removed and replaced with another disc having the following densities of magenta filters: 16M-30; 16M-40 and 16M-50. Similarly, discs 32A and 32B can provide cyan filters of a density range of 5 through 50 and yellow filters over the density range of 5 through 50.

EXAMPLE 1

Tulips were photographed against a background and with overhead lighting. The background was too close to the tulips and was partially illuminated. This produced distracting light blotches in the background distracting from an otherwise pleasing print. The problem was to remove the distracting elements without darkening delicate highlights of the tulip petals and blossoms.

Because of the large area which had to be darkened, apparatus of FIG. 1 ("Apparatus") was used at a maximum light intensity setting and no filter in the light path. The enlarger lens was stopped down to provide a two minute exposure which was divided into two equal intervals. During the first minute of exposure, the Apparatus was used at its maximum aperture (6) to "paint out" distracting elements in large areas. Then, for the second minute of exposure, a small aperture (2) was used to "paint out" distracting elements which were adjacent to and between blossoms and petals. The resulting "painted" photographic print showed the luminous tulip blossoms against a uniform black background.

EXAMPLE 2

This photograph was taken from the floor of a dark slot canyon with the camera pointed toward the bright surface opening. The resulting negative had detail in both highlights and shadows. However, highlights were too dense to be rendered by conventional printing procedures. The problem was to bring out detail in highlight areas. Measurements with a sensitive darkroom, exposure meter indicated that "burning in" was not an option even at maximum aperture of the enlarging lens.

An exposure time of 46 seconds at a lens aperture of f11 ½ was established to make prints with mid tone and shadow detail. To add tone and bring out highlight detail, the exposure was divided into equal 23 second intervals and the Apparatus was used to flash problem areas. During the first interval, the following settings were used for overall flashing of the highlight area: Intensity (I)=2 (Meter-30); contrast (C)=1; Aperture (A)=4. Then, during the second interval, edges of the highlight area, which were lighter than the center, were flashed with increased intensity and smaller aperture. The new settings on the Apparatus were I=0 (Meter 25); C=1; A=2. Lower numbers for intensity settings correspond to increased brightness.

The resulting print showed good detail in the central highlight area and slight detail along the edges. Another print was made using the described procedures but using a lower contrast filter (#00). This alternative also brought out highlight detail and decreased the difference in tone between the center and edges of the highlight area.

EXAMPLE 3

This was a close up of a flowering shrub with delicate white blossoms which were in sharp focus in the foreground. However, a blossom in the background was out of focus and also was very light in tone which made it compete as a center of interest. The problem was to add just enough tone to the out of focus blossom so it would recede into the background.

Preliminary tests were made on 4×5 sections of 5 ½×7 enlargements to determine the best settings for darkening the offending blossom. The following combinations were evaluated: 1) I=4.5; C=1; A=3. (2) I=3; C=1; A=3 (3) I=3; C=00; A=3. Combination #3 provided the required darkening.

The enlarger was then raised to provide for an 11×14 enlargement and the enlarger lens was opened to provide more light for the increase in magnification. Because the working distances between the Apparatus and projected images were the same for both enlargements no changes in flashing intensity or contrast were required. Only the "aperture" had to be increased from 3 to 6 for greater coverage. (The aperture refers to the relative sizes of openings for projected light. Changing sizes does not affect light intensity because a focused light source is not used.)

Having illustrated and described the principles of my invention in a preferred embodiment thereof, it should be readily apparent to those skilled in the art that the invention can be modified in arrangement and detail without departing from such principals. I claim all modifications coming within the spirit and scope of the accompanying claims.

What is claimed:

1. A method for selectively flashing during photographic enlarging, which comprises
    providing a photographic enlarger, a photographic negative, a photographic printable substrate, and a device including a light source, the device including independent controls for varying (a) light intensity, (b) the area of projected light, (c) contrast, when used with variable contrast enlarging paper, and (d) hue and density, when used in color enlarging from color negatives;
    photographically enlarging the photographic negative by emitting light from the photographic enlarger through the photographic negative onto the photographic printable substrate;
    independently adjusting the controls on the device for varying (a) the light intensity, (b) the area of projected light, (c) the contrast, when used with variable contrast enlarging paper, and (d) color hue and density, when used in color enlarging from color negatives, of the light being emitted from the device, thereby bringing out detail in delicate highlight areas, and/or removing distracting elements from dark backgrounds and/or creating improved tonal balances and/or creating special effects in an enlarged photographic print; and
    selectively flashing with the device more than one area of the photographic printable substrate during main divided exposure so that at least one area of the photographic printable substrate is selectively flashed at a first contrast and another area of the photographic printable substrate is selectively flashed at a second contrast, less than the entire photographic printable substrate beina subjected to selective flashing with the device.

2. The method of claim 1, wherein photographic selective flashing with the device is carried out without adding significant time to the photographic enlarging process.

3. The method of claim 1, which includes the further step of making flashing time equal to the main exposure time with the enlarger by adjusting light intensity of the device to obtain the desired effect in an enlarged photographic print.

4. The method of claim 1, which includes the further step of photographically selectively flashing delicate highlights with appropriate lower contrast filters, and photographically selectively flashing dark shadow areas with appropriate higher contrast filters.

5. The method of claim 1, which includes the further step of providing said device which comprises a first section which emits light and a second section including a plurality of filters for controlling contrast, or for controlling color hue and density, and rotating the first and second sections with respect to each other for adjusting contrast or color hue and density of the light being emitted by the device.

6. The method of claim 1, which includes the further step of providing an said device which comprises a first section which emits light, a second section which controls contrast, when used with variable contrast enlarging paper, or which controls color hue and density, and a third section including a plurality of apertures for controlling the area of projected light, and arranging the third section with respect to first and second sections for adjusting the area of the light being emitted by the device at a desired contrast or color hue and density.

7. The method of claim 1, which includes the further step of projecting a blank light onto the photographic printable substrate, adjusting the blank light area to fit well within an area to be flashed on the photographic printable substrate, and moving the blank light back and forth across the area to be flashed in a feathering action between adjacent areas on the photographic printable substratelfor producing a smooth photographic appearance without affecting adjacent areas not requiring flashing.

8. The method of claim 1, which includes the further step of providing in the device, replaceable discs having at least one aperture for controlling the area of projected light from the device, the size and shape of an aperture in each of the replaceable discs being determined by the size and shape of the area to be selectivelv flashed.

9. The method of claim 1, which includes the further step of providing in the device, replaceable discs for controlling the contrast range of device when used with variable contrast enlarging paper.

10. The method of claim 1, which includes the further step of providing in the device, replaceable discs for controlling the range of the hue and density of the primary cyan, magenta and yellow colors.

11. The method of claim 1, which includes the further step of providing the device, which comprises a first section which emits light, and a second section including a plurality of apertures for controlling the area of projected light, and arranging the first section with respect to the second section for adjusting area of the light being emitted by the device, while maintaining the device at a substantially constant distance from the enlarged photographic image to be selectively flashed and without varying the light intensity.

12. The method of claim 1 with the further step of selectively flashing with the device more than one area of a photographically printable substrate during a divided main exposure so that at least one area of the photographically printable substrate is selectively flashed at a first light intensity and another area of the photographically printable substrate is selectively flashed at a second light intensity.

13. The method of claim 1 with the further step of selectively flashing more than one area of a photographic printable substrate during a divided main exposure so that one area of the photographic printable substrate is selectively flashed using a first aperture and another area of the photographic printable substrate is selectively flashed using a second aperture.

14. The method of claim 1 with the further step of changing the working distance of the device and adjusting light intensity of the device by rotating the rheostat knob to null a darkroom exposure meter.

15. A device for selectively flashing an area less than an entire photoaraphical print, during photographic enlarging of a photographic negatives which comprises independently adjustable controls for varying (a) light intensity, (b) the area of projected light, (c) contrast, when used with variable contrast enlarging paper, and (d) hue and density, when used in color enlarging from color negatives, the device which comprises a first section which emits light, a second section which controls contrast, or which controls color hue and density, and a third section including a plurality of apertures for controlling the area of projected light, and rotating the third section with respect to first and second sections for adjusting area of the light being emitted by the device at the desired contrast or color hue and density, and adding the requisite size, intensity, and contrast of light therefrom for selective photographic flashing, of an area less than the entire photographic printable substrate, during the photographic enlarging of the photographic negative by independently adjusting (a) light intensity, (b) the area of projected light, (c) contrast, when used with variable contrast enlarging paper, and (d) color hue and density, when used in color enlarging from color negatives, of the light being emitted from the device, thereby bringing out detail in delicate highlight areas, and/or removing distracting elements from dark backgrounds and/or creating improved tonal balances and/or creating special effects in an enlarged photographic print.

16. The device of claim 15, which comprises a first section which emits light and a second section including a plurality of filters for controlling contrast, or for controlling color hue and density, and rotating the first and second sections with respect to each other for adjusting the color of the light being emitted by the device.

17. The device of claim 15, which includes replaceable discs having at least one aperture located therewithin which is sized and shaped for controlling the area of projected light from the device.

18. The device of claim 15, which includes replaceable discs for controlling the contrast of light from the device for use with variable contrast black and white enlarging paper.

19. The device of claim 15, which includes replaceable discs for controlling the hue and density of the primary cyan, magenta and yellow colors.

20. The device of claim 15, wherein the adjustable control for varying light intensity includes a calibrated dial for adjusting the relative light intensity.

21. The method of claim 3 with the further step of changing the working distance of the device and adjusting light intensity of the device by rotating the rheostat knob to null a darkroom exposure meter.

22. A method for selectively flashing during photographic enlarging, which comprises
providing a photographic enlarger, a photographic negative, a photographic printable substrate, and a device including a light source, the device including independent controls for varying (a) light intensity, (b) the area of projected light, (c) contrast, when used with variable contrast enlarging paper, and (d) hue and density, when used in color enlarging from color negatives, said device comprising a first section which emits light and a second section including a plurality of filters for controlling contrast, or for controlling color hue and density, rotating the first and second sections with respect to each other for adjusting contrast or color hue and density of the light being emitted by the device;

enlarging the photographic negative by emitting light from the photographic enlarger through the photographic negative onto the photographic printable substrate; and selectively flashing an area less than the entire photographic printable substrate, by independently adjusting the controls on the device for varyina (a) light intensity, (b) the area of projected light, (c) contrast, when used with variable contrast enlarging paper, and (d) color, hue and density, when used in color enlarging from color negatives, of the light being emitted from the device, thereby bringing out detail in delicate highlight areas, and/or removing distracting elements from dark backgrounds and/or creating improved tonal balances and/or creating special effects in an enlarged photographic print.

23. A method for selectively flashing during photographic enlarging, which comprises
providing a photographic enlarger, a photographic negative, a photographic printable substrate, and a device including a light source, the device including independent controls for varying (a) light intensity, (b) the area of projected light, (c) contrast, when used with variable contrast enlarging paper, and (d) hue and density, when used in color enlarging from color negatives;

photographically enlarging the photographic negative by emitting light from the photographic enlarger through the photographic negative onto the photographic printable substrate;

selectively flashing an area less than the entire photoaraphic printable substrate, by independently adjusting the controls on the device for varyina (a) light intensity, (b) the area of projected light, (c) contrast, when used with variable contrast enlarging paper, and (d) color, hue and density, when used in color enlarging from color negatives, of the light being emitted from the device, thereby bringing out detail in delicate highlight areas, and/or removing distracting elements from dark backgrounds and/or creating improved tonal balances and/or creating special effects in an enlarged photographic print; and projecting blank light onto the photographic printable substrate, adjusting the blank light area to fit well within an area to be selectively flashed on the photographic printable substrate, and moving the blank light back and forth across the area to be flashed in a feathering action between adjacent areas on the photographic printable substrate for producing a smooth photographic appearance without affecting adjacent areas not requiring flashing.

24. A method for selectively flashing during photographic enlarging, which comprises
providing a photographic enlarger, a photographic negative, a photographic printable substrate, and a device including a light source, the device including independent controls for varying (a) light intensity, (b) the area of projected light, (c) contrast, when used with variable contrast enlarging paper, and (d) hue and density, when used in color enlarging from color negatives;

photographically enlarging the photographic negative by emitting light from the photographic enlarger through the photographic negative onto the photographic printable substrate; and selectively flashing an area less than the entire photographic printable substrate, by independently adjusting the controls on the device for varvina (a) light intensity, (b) the area of projected light, (c) contrast, when used with variable contrast enlarging paper, and (d) color, hue and density, when used in color enlarging from color negatives, of the light being emitted from the device, thereby bringing out detail in delicate highlight areas, and/or removing distracting elements from dark backgrounds and/or creating improved tonal balances and/or creating special effects in an enlarged photographic print.

25. A device for selectively flashing during photographic enlarging of a photographic negative, an area less than an entire photographical print, which includes independently adjustable controls for varying (a) light intensity, (b) the area of projected light, (c) contrast, when used with variable contrast enlarging paper, and (d) hue and density, when used in color enlarging from color negatives, the device adding the requisite size, intensity, and contrast of light therefrom for selective photographic flashing, of an area less than the entire photographic printable substrate, during the photographic enlarging of the photographic negative by independently adjusting (a) light intensity, (b) the area of projected light, (c) contrast, when used with variable contrast enlarging paper, and (d) color hue and density, when used in color enlarging from color negatives, of the light being emitted from the device, thereby bringing out detail in delicate highlight areas, and/or removing distraction elements from dark backgrounds and/or creating improved tonal balances and/or creating special effects in an enlarged photographic print.

* * * * *